Fig. 6.

S. T. PARK & J. E. PHILLIPS.
RECORDING DEVICE FOR VEHICLES.
APPLICATION FILED MAR. 28, 1908.

1,054,601.

Patented Feb. 25, 1913.
7 SHEETS—SHEET 5.

Witnesses:
Aug. L. Savoie
Chas. H. Bull

Inventors:
Samuel T. Park and
John E. Phillips.
By Sheridan and Wilkinson
Attys.

UNITED STATES PATENT OFFICE.

SAMUEL THOMAS PARK AND JOHN EMMITT PHILLIPS, OF DANVILLE, ILLINOIS, ASSIGNORS TO LOCOMOTIVE RECORDING DYNAMOMETER COMPANY, OF CHICAGO, ILLINOIS, A CORPORATION OF MAINE.

RECORDING DEVICE FOR VEHICLES.

1,054,601.  Specification of Letters Patent.  Patented Feb. 25, 1913.

Application filed March 28, 1908. Serial No. 423,897.

*To all whom it may concern:*

Be it known that we, SAMUEL THOMAS PARK and JOHN EMMITT PHILLIPS, citizens of the United States, residing at Danville, in the county of Vermilion and State of Illinois, have invented certain new and useful Improvements in Recording Devices for Vehicles, of which the following is a specification.

The object of our invention is to provide apparatus for moving a record sheet to correspond with the movement of a vehicle and to provide apparatus for recording thereon the draw-bar pull of a locomotive or any other data of a varying character. This general object and various other objects of detail will be made apparent in the following specification and claims, taken in connection with the accompanying drawings, in which—

The particular embodiment of our invention which we have chosen to illustrate in this specification comprises an electric battery and electric motor adapted to be driven thereby and a recording paper adapted to be moved by the rotation of the motor. The circuit of the battery and motor is made and broken regularly by the rotation of the axle under the tender and each time that the circuit is made the motor moves a definite distance and thereby moves the recording paper a distance corresponding accurately to the movement of the vehicle, in this case a locomotive.

Referring to the drawings, the cab, tender, and front wheel axle of the tender are designated respectively by the reference numerals 20, 21 and 22. A band of insulating material 22ª surrounds the axle 22 and outside of this is a band of conducting material 23. This has a yielding projection 24. A fixed casing 25 surrounds the parts just described, fitting closely at the sides 26 upon the axle 22 so as to exclude dirt from the chamber within. This casing 25 has an upwardly extending leg 27 with a hole 28 at the top end which is connected by the chains 29 to the underframe of the tender at the points 30. Thus the casing 25 is prevented from rotating with the axle 22, but relative movement between the body of the tender and axle due to the truck springs is accommodated. Within the casing 25 there are three contact brushes 24ª, 31 and 32. The former presses constantly on the conducting ring 23, while the two others, 31 and 32, are oppositely disposed and are each adapted to be frictionally engaged by the yieldingly projecting member 24. From the three brushes 24ª, 31 and 32 extend the respective conductors 34, 33 and 35. The conductor 34 goes through the battery 36 and thence to the branching point 36ª in the locomotive cab. One branch extends through a solenoid 95 and then returns as designated by the reference numeral 33 to the contact brush 31. The other branch that diverges from the point 36ª goes through a make and break device, generally designated at 41, thence through the electric motor 40 and thence the circuit is completed by the conductor 35 back to the contact brush 32. A coupling between the locomotive proper and the tender is provided having opposed members 37 and 38, which are adapted to connect the three conductors 34, 33 and 35 in proper order.

Within the engineer's cab the recording apparatus, generally designated as 39, is placed. This comprises the electric motor 40 and the make and break device 41 as well as other apparatus which will now be described in detail.

Figure 6:
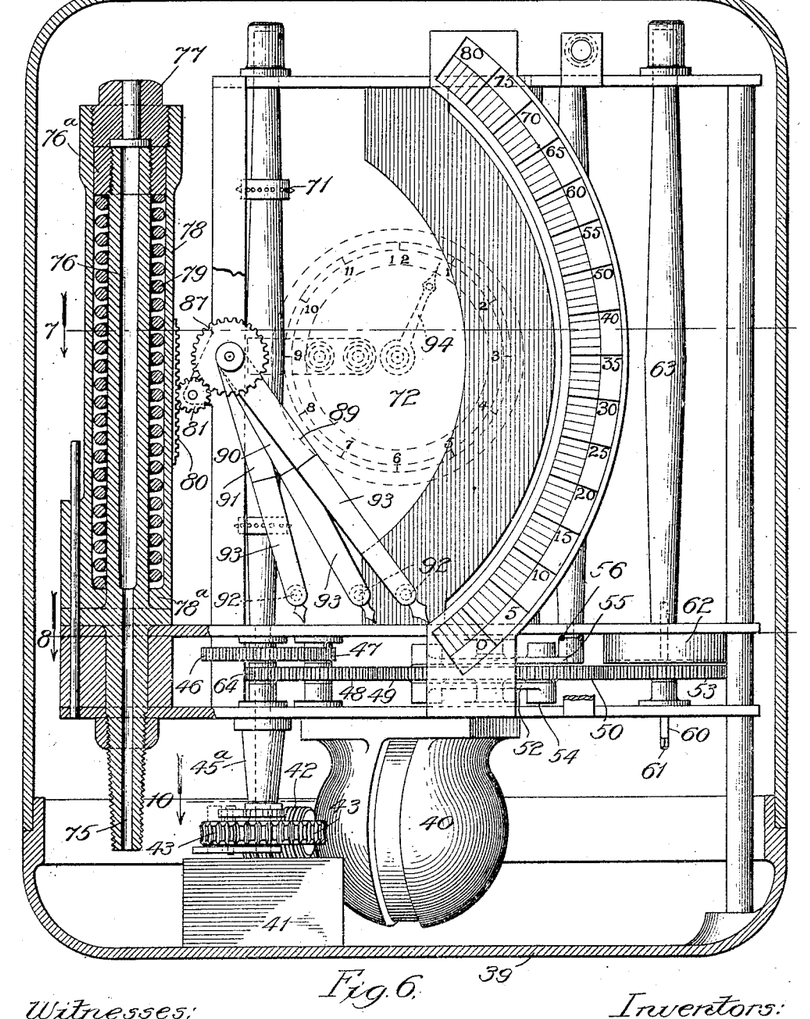
Fig. 6 is a sectional elevation of the recording apparatus which is installed in the locomotive cab.
Figure 8:
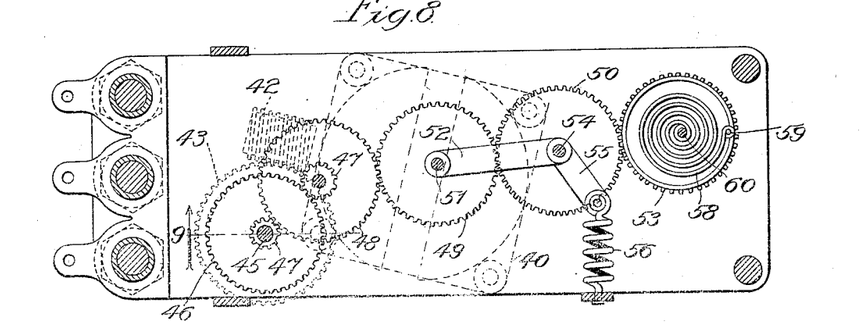
Fig. 8 is a similar horizontal section taken on the line 8 of Fig. 6.
Figure 9:
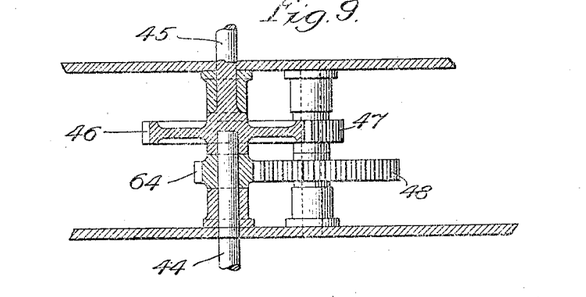
Fig. 9 is a vertical section illustrating a detail, taken on the line 9 of Fig. 8.

Referring to Fig. 6 and the subsequent figures, the shaft of the motor 40 carries the worm 42, which engages the worm wheel 43 on the shaft 44. This shaft 44 extends upwardly from the worm wheel 43 as viewed in Fig. 6 being supported by the bracket 45ª and at its upper end it carries a small gear pinion 64. This engages the large gear wheel 48, which is on the same shaft with the small gear pinion 47, which in turn engages the large gear wheel 46. As shown in Fig. 9, the shaft 45 of the gear wheel 46 is independent from the shaft 44 and it is at once apparent from this figure that the speed of the shaft 45 is considerably reduced from that of the shaft 44. The gear wheel 48 is also in mesh with the gear wheel 49, which is mounted on the fixed axis 51. The beam 52 is pivoted on this axis at one end and at its opposite end it carries the gear wheel 50 on the shaft 54, the two gears 49 and 50 constantly engaging each other. In the position shown in Fig. 8 the gear wheel 50 is in engagement with the gear 53, but it is to be noted that by rotation of the arm 52 in a counter-clockwise direction this engagement may be broken. A link 55 extends from the end 54 of the beam 52 and is connected by a spring 56 to a fixed point of the casing. The free end of this spring is guided by the slot 57 and the tendency of the spring 56 is to hold the train of gears in engagement, as shown and described in connection with Fig. 8.

The gear wheel 53 is fixed upon the shaft 60, the latter being provided with a squared end 51 to facilitate the application of a winding key. Also attached to this shaft 60 is the inner end of a coil spring 58, the outer end of which is attached at the point 59 to the drum 62. The shaft 60 is a prolongation of the paper drum 63. This has a slot 68 in which the end of the paper may be introduced. The roll of paper on which the record is to be traced is first mounted on the drum 65 from which the free outer end 66 extends, as indicated by the dotted line in Fig. 7 and the arrows, to the winding drum 63. A spring 67 presses constantly on the paper upon the drum 65 and thus acts as a brake to prevent loosening of the paper upon the roll 65. As clearly appears in Fig. 7, the course of the paper is under the roller 69, under the plate 70, around the roller 45ᵇ, in front of the clock 72, under the roller 73 and the shifting roller 74 and finally around the winding roller 63. The roller 45ᵇ is on an extension of the shaft 45, which has a positive connection with the motor 40. The said roller carries two collars 71 with short blunt projections thereon, which engage the paper without puncturing it and cause it to feed definitely as the roller rotates.

Figure 7:
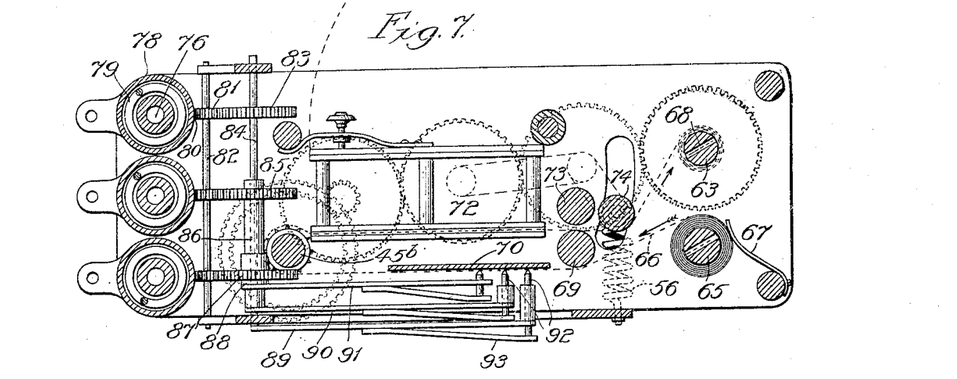
Fig. 7 is a horizontal section taken on the line 7 of Fig. 6.

The mechanism that has just been described is that by which the recording paper is moved. It will now be in order to describe the mechanism by which records are made upon this moving paper. As illustrated in Figs. 6, 7 and 8 mechanism is provided by which pressures from three different sources may be recorded on the paper. One of these pressures may be that of the steam in the boiler, another may be that of the air for the air-brake system and another may be the pressure on a draw-bar dynamometer, as transmitted by hydraulic means. If preferred the pressure of the steam in the engine cylinder may be recorded instead of the air pressure. Since the three pressure transmitting mechanisms are substantially alike it will be sufficient to describe one of them in detail. The pressure conduit is connected at 75 (see Fig. 6) whence the pressure fluid flows to the chamber 76, which has a piston head 76ª. Beyond this is a cap 77 to which is tightly fitted an outer cylindrical shell 78. At its opposite end the shell 78 has an inturned lip 78ª which by engagement with the wall of the shaft 76 forms a guide and at the same time forms a seat for the spring 79, which acts between the said lip 78ª and the head 76ª. It will at once be apparent that the pressure in the chamber 76 acting upon the head 77 tends to push the cylindrical shell 78 outwardly and thus compress the spring 79. A rack 80 is affixed to one side of the cylinder 78 and engages a small pinion 71 loosely mounted on the shaft 82. This pinion also engages one of the three small gears 83, 85 or 87. The gear 83 is fixed on the long shaft 84, the gear 85 is fixed on the sleeve 86, which is mounted to rotate upon the shaft 84 and the gear 87 is fixed upon the outer sleeve 88, which rotates upon the inner sleeve 86. Fixed to the long shaft 84 is the pointer 89, fixed to the sleeve 86 is the pointer 90 and fixed to the short sleeve 98 is the pointer 91. On comparing Figs. 6 and 7 it will at once be apparent that reciprocation of one of the cylinders 78 will swing the corresponding pointers 89, 90 or 91 in greater or less degree across the record sheet. The recording stylus or pencil 92 held down by the spring 93 is carried at the end of each of the pointers 89, 90 and 91. As shown in Fig. 7, the pencils 92 press against the paper which at this point is supported by the plate 70. The clock 72 has a single hand 94, which also carries a recording pencil or stylus at its end which sweeps back and forth across the paper.

Figure 13:
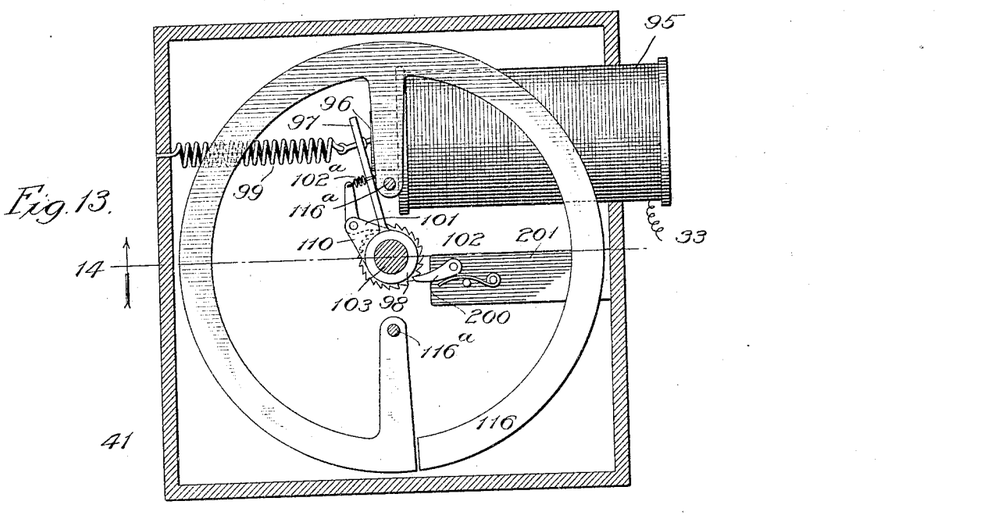
Fig. 13 is a section taken on the plane indicated by the line 13 in Fig. 14.
Figure 14:
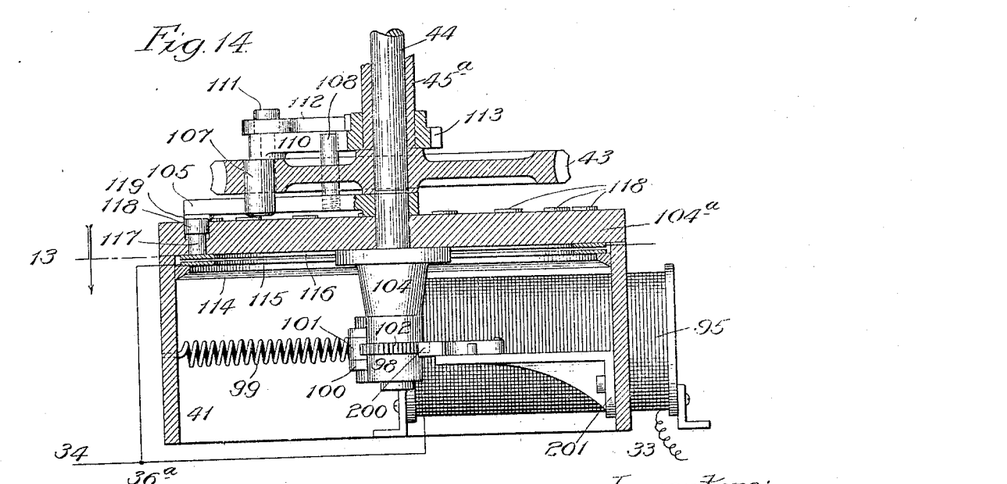
Fig. 14 is a section taken on the line 14 in Fig. 13.

The mechanism for making and breaking the circuit of the motor 40 will now be described. This is mounted within and upon the box 41. A solenoidal coil 95 is provided with a core 96 connected to the end of a lever arm 97. The other end of this lever consists of a sleeve 98 loosely embracing the shaft 103. The lever arm is pulled by the spring 99 in a direction to withdraw the core 96 in opposition to the pull of the solenoid 95. The sleeve 98 carries two projecting lugs 100 between which is pivoted a pawl 101 adapted to engage the ratchet 102, the latter being fixed upon the shaft 103. The spring 102ª shown in Fig. 13 keeps the pawl in engagement with the ratchet, and the pawl 200 pivoted on the bracket 201 prevents retrograde movement of ratchet 102. The shaft 103 is supported by the bracket 104 shown in Fig. 14, which is affixed to the under inner side of the top cover 104ª of the box 41. Outside of the box 41 the shaft 103 carries the arm 105, which is adapted to sweep over the outer surface of the cover 104ª. The arm 105 has a notch 106 on one side, as may be seen in Fig. 11, which is adapted to be engaged by a pin 107 (see Fig. 14) depending from the worm wheel 43. The arm 105 also carries a long upstanding pin 108, which projects through a slot 109 in the worm wheel 43. A pawl 110 is pivoted upon the pin 111 on the wheel 43, a leaf spring 112 being provided to hold the said pawl in engagement with the ratchet 113, which is stationary, being fixed upon the bracket 45ª. On the ledge 114 within the box 41 a circular metallic contact strip 115 is supported in fixed position. Opposed to this is a similar contact strip 116 supported from the under side of the cover plate 104ª by the pins 116ª. Thus it will be seen that the contact strip 116 is mounted so as to permit a slight displacement away from the cover 104ª. A series of pins 117 is arranged circumferentially in appropriate holes in the cover plate 104ª. Each pin 117 has a head 118 which projects slightly above the outer surface of the cover 104ª. When any pin 117 is pushed down so that its head 118 is flush with the outer surface, the effect is to push the ring 116 into contact with the ring 115. The extremity of the arm 105 has a rounded knob 119 on its under side, which pushes the pins 118 down as it rides over them.

Having now described the structure of the apparatus we will proceed to state how it operates.

Figure 1:
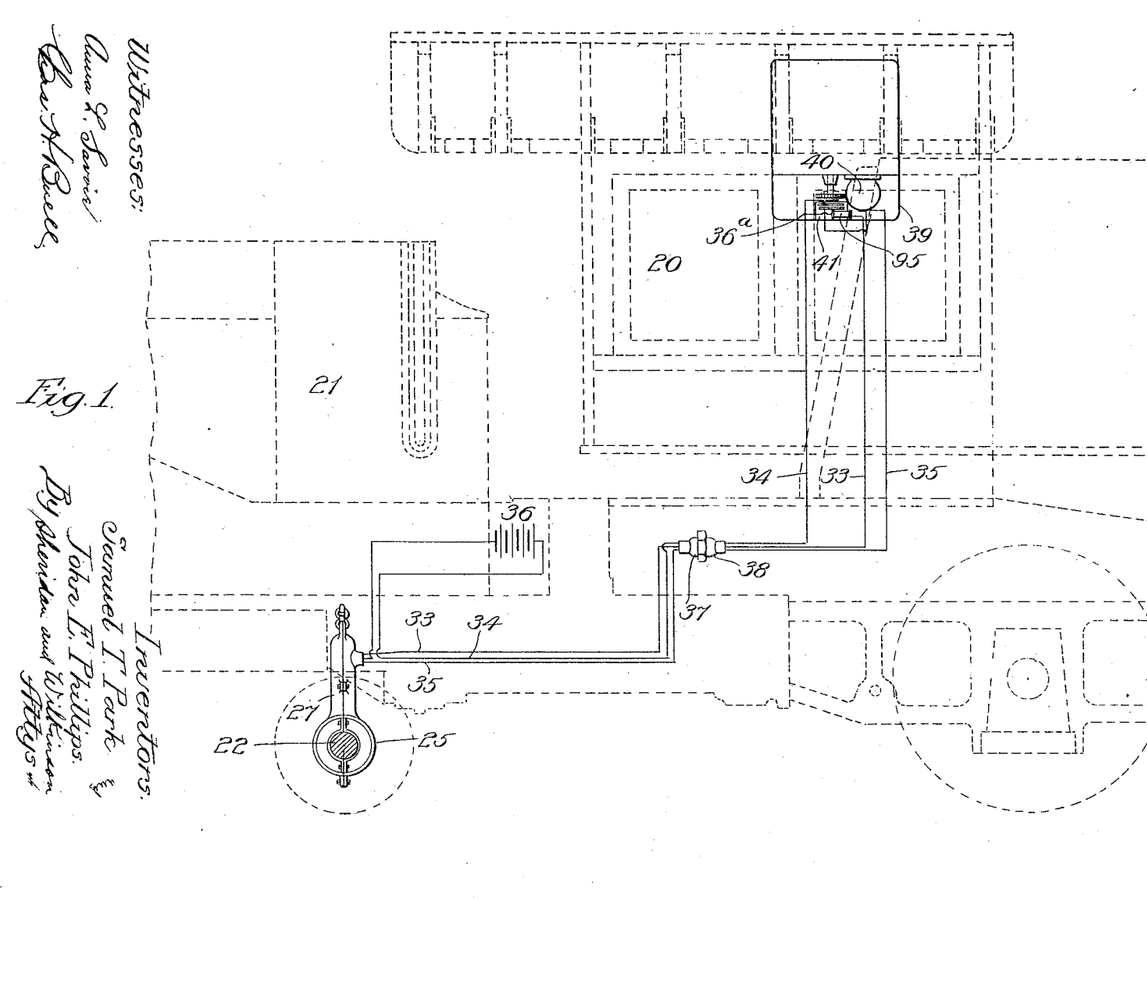
Figure 1 is a diagrammatical representation in elevation of the general arrangement of our device.
Figures 2, 3, 4, 5:
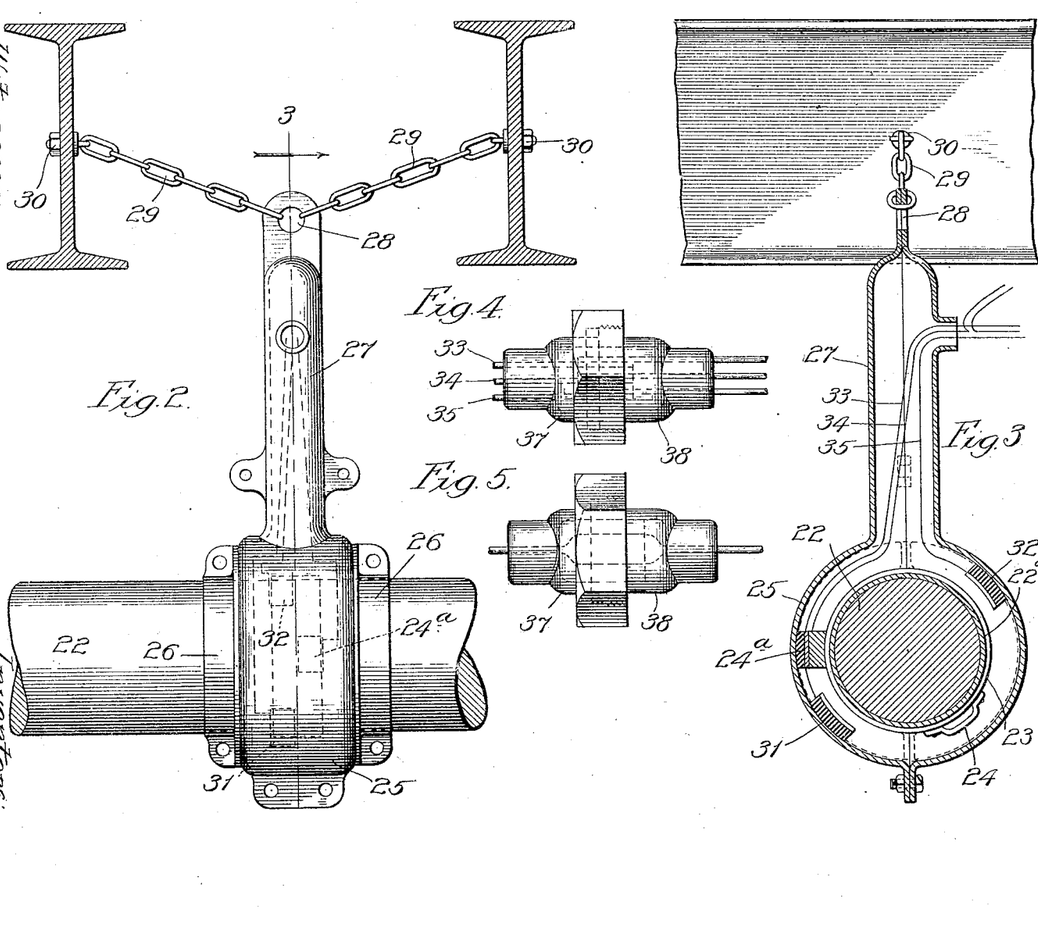
Fig. 2 is an end elevation of the car axle with related apparatus.
Fig. 3 is a section taken on the line 3 of Fig 2.
Figs. 4 and 5 illustrate a coupling for the electric conductors between the locomotive and the tender.
Figures 10, 11, 12:
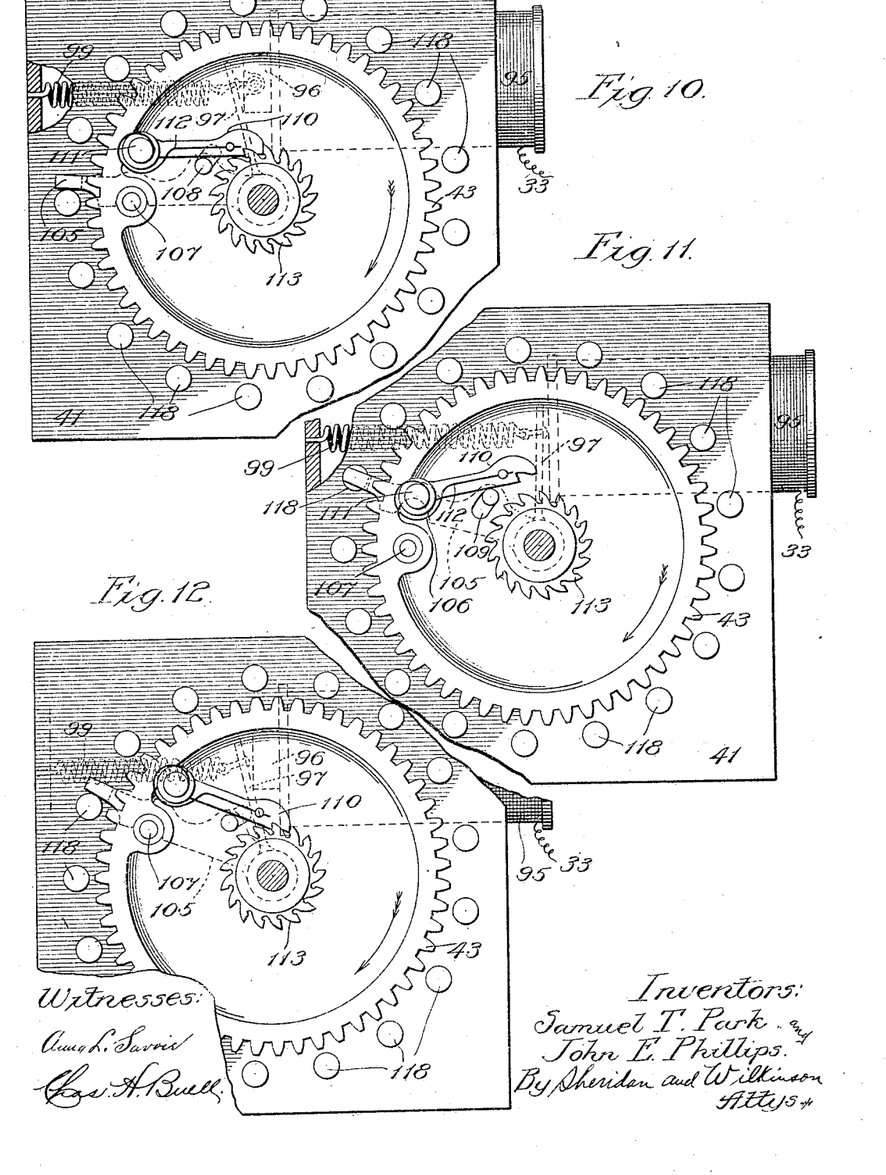
Figs. 10, 11 and 12 are plan views of a step by step mechanism which forms a part of our invention.
Figure 15:
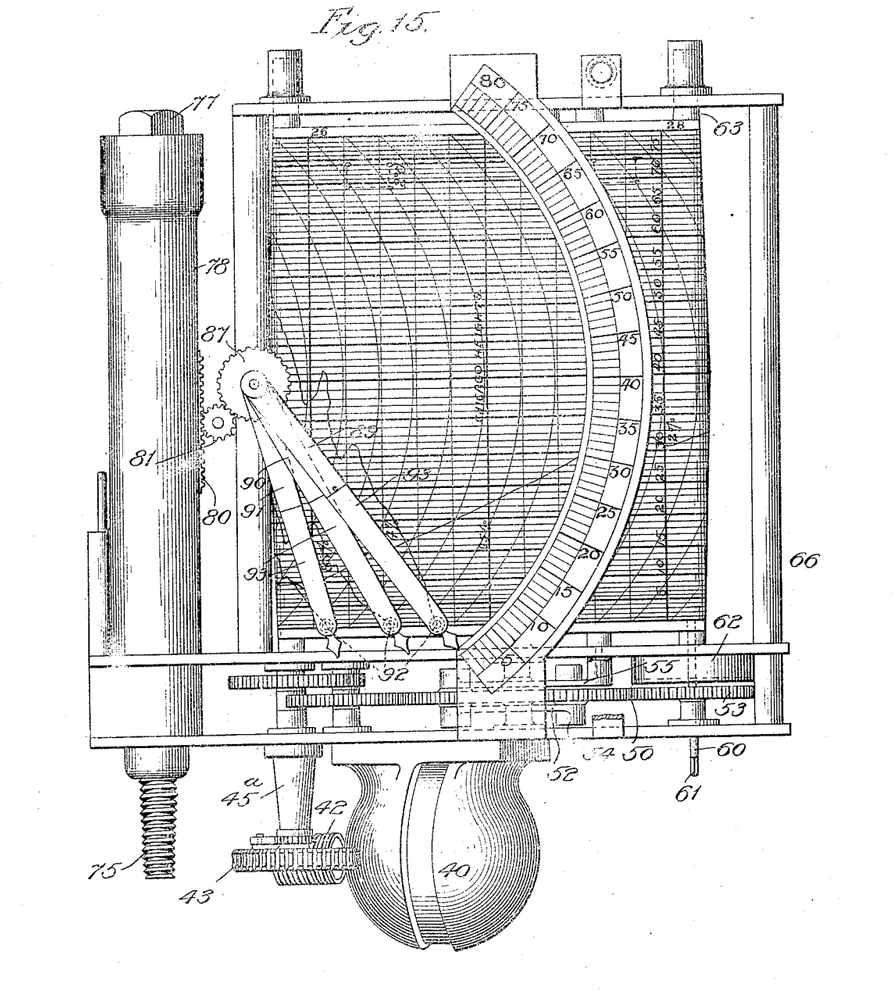
Fig. 15 is a view in elevation of the recording apparatus.

On one side a conductor extends from the battery 36 to the contact ring 23 on the wheel axle of the car, and on the other side a conductor extends to the branching point 36ª. From this point the branch 33 extends to the brush 31 passing on its way through the solenoid 95. Hence, whenever the brush 24 on the car axle 22 sweeps over the stationary brush 21 in the housing 25, the battery circuit will be completed through the solenoid 95. Prior to this closure of the circuit the parts will have the position indicated in Fig. 10, but immediately upon energization of the solenoid 95 the core 26 will be drawn therein, the arm 97 will be rotated and the pawl 101 by engagement with the ratchet 102 will rotate the said ratchet and the shaft 103 to which it is attached. This will cause a rotation of the arm 105 from the position shown in Fig. 10 to the position shown in Fig. 11, inasmuch as said arm is rigidly attached to the shaft 103. Two results follow at once from this rotation of the arm 105, (1) the pin 108 carried by the arm 105 lifts the pawl 110 out of engagement with the fixed ratchet 113, and (2) the extremity of the arm 105 rides upon one of the knobs 118 and pushes down the attached plug 117, thus forcing the ring 116 into contact with the ring 115. This action closes the branch circuit from the point 36ª through the motor 40 and back through the conductor 35 to the brush 32 in the housing 25. Nothing further happens until the brush 24 in its rotation after leaving the brush 31 comes in contact with the brush 32. Thereupon the battery circuit is completed through the motor 40. This begins to rotate at a high speed which is very considerably reduced by the worm and worm wheel gearing 42—43. Thus the worm wheel 43 is caused to rotate from the position shown in Fig. 11 to the position shown in Fig. 12. As it rotates it carries the pin 111 and the attached pawl 110 with it. This takes the pawl 110 away from the pin 108, which in Fig. 11 holds the said pawl out of engagement with the fixed ratchet 113. Thus the pawl drops down into the next tooth of the ratchet from that which it engages as illustrated in Fig. 10, and thus when the motor has rotated enough to turn the wheel 43 until the pawl 110 engages the next successive tooth of the ratchet 113, the motor will be positively stopped. However, at the last part of this brief rotation of the worm wheel 43 the depending stud 107 thereon will engage the notch 106 on the arm 105 and will move the said arm off the head 118. Thus the rings 115 and 116 will separate and the circuit through the motor 40 will be broken just at the time the pawl 110 comes against the tooth of the fixed ratchet 113. This description completes a cycle of operations corresponding to a complete rotation of the car axle 22. In the particular embodiment of our invention illustrated in the drawings there are 17 contact studs 118 and the worm wheel 43 has three times 17 or 51 teeth in its periphery. Thus in changing from the position illustrated in Fig. 10, to that illustrated in Fig. 12, the wheel 42 will have advanced three teeth, that is, the motor 40 will have made three revolutions. Thus the shaft 44 will have been rotated one-seventeenth part of a complete revolution and the paper 66 will have been slightly advanced by the corresponding rotation of the drum 45ᵇ. It is to be observed that the device would work equally well for motion of the vehicle in either direction. This is at once apparent on inspection of Fig. 3, which shows that the brushes 31 and 32 will in either case contact alternately with the brush 24. These contacts occur in very rapid succession when a locomotive is traveling at any considerable degree of speed, hence for all practical purposes the movement of the paper 66 is substantially uniform. No matter whether the duration of contact between the brush 24 and the brush 32 is long or short, the circuit of the motor will be broken as soon as the motor has made three revolutions, because then the arm 105 will be pushed off the stud 118 as is apparent on comparing Fig. 11 with Fig. 12. When the gear train is in engagement throughout from the shaft 44 to the wheel 53 the latter will be rotated at a speed considerably greater than the speed of the shaft 45 with the driving roll 45ᵇ. This is because the speed of the shaft 45 is reduced considerably by the pinion 47 in engagement with the gear 46. Thus the gear wheel 53 will wind ahead of the winding drum 63 producing an increasing tension on the clock spring 58, which will be communicated to the paper 66 and will pull the roller 74 up in opposition to the spring 56. This movement will swing the beam 52 around its pivot 51 and will cause the gear 50 to disengage from its adjacent gear 53. Later on when the tension of the clock spring 68 is reduced and thus the tension of the paper 66 is reduced the spring 56 will again become effective to pull the gears back into engagement. Thus it will be seen that the mechanism comprising the gear train 64—48—49—50—53 performs the function of winding the spring 58 and then this spring serves to draw the paper 66 on the drum 63 as fast as it is fed along by the driving roll 45ᵇ. Thus it will be seen that the paper feeds across over the plate 70 by a series of short quick movements, so that its speed is substantially proportional to the speed of the moving locomotive. All the time the three index hands or pointers 89, 90 and 91 occupy positions which by their distance from the edge of the record paper indicate the magnitude of the quantity which they are intended to measure. For example, if the pointer 89 indicates the steam pressure in the boiler then the distance of the line traced by the stylus 92 from the edge of the paper indicates the steam pressure corresponding to various points on the run of the locomotive; similarly for the other quantities to be measured and recorded. The paper is preferably ruled, as indicated in Fig. 15, so that it shows at a glance what portion of its length corresponds to any particular point on the run of the locomotive. In addition, permanent data of the run may be recorded on the paper at the side, as for example, the curves and the grades.

In order to facilitate a ready comprehension of the conditions under which the locomotive has been operating at any given instant the arrangement of the recording markers shown in the drawing has been adopted. It will be noted that the markers move in paths adjacent to each other, thereby causing the record made by any marker at a given instant to lie close to the record made by the other markers at the same moment. If it is desired to note the steam pressure, air pressure and tractive force at any given moment, corresponding to the position of the locomotive at that instant, as indicated by the ruling upon the record sheet, it is merely necessary to note the points in the curves representing these magnitudes which lie in a line corresponding to the paths of movement of the markers. These paths of movement in the present instance are a curved line extending transversely of the sheet, and lie so close together that an accurate reading can be made simply by glancing at the record sheet and noting the points on the three record curves which lie in such a line. The eye may be further guided in selecting the three points simultaneously recorded by means of curved lines parallel to the paths of movement of the markers, such ruled lines being printed upon the record sheet prior to placing it in the machine. Whatever the precise form of the path of movement of the markers, it is essential that these paths lie close to each other, which will enable easy reading whether such paths be curved or straight.

It will be seen that we have provided an apparatus in which the recording paper is driven by a motor so arranged that its movement is at all times strictly proportional to the movement of the locomotive or other vehicle.

While we have described our invention as applied in a specific way to a locomotive, it is evident that within the scope of the appended claims it may find a much wider range of operation and may be widely varied in its structural details.

We claim:—

1. In combination with a wheeled vehicle, a record sheet feed roll, a motor to drive said roll, means actuated by the rotation of the vehicle wheel to put the motor in operative condition, and means to thereafter stop the motor when it has moved the record sheet a definite distance.

2. In combination with a vehicle, a record sheet feed roll, a motor to drive said roll, a stop for the motor, means actuated by the movement of the vehicle to release the stop and to energize the motor, and means to restore the stop when the record sheet has moved a definite distance.

3. In combination with a wheeled vehicle, a record sheet feed roll, an electric motor to drive said roll, an energizing circuit therefor, a stop for the motor, an electromagnet to withdraw the stop, an energizing circuit therefor, and switches controlled by the rotation of the vehicle wheel to close said circuits.

4. In combination with a wheeled vehicle, a record sheet feed roll, a motor to drive said roll, a battery, an electro-magnet, a stop for the motor adapted to be withdrawn thereby, branch circuits from the battery through the motor and the magnet, control switches for these branches adapted to be operated by rotation of the vehicle wheel, and a further switch in the branch to the motor, said last named switch being adapted to be broken by the movement of the motor through a predetermined distance.

5. In combination with a wheeled vehicle, a record sheet feed roll, a motor to drive said roll, a battery, an electro-magnet, a stop for the motor adapted to be withdrawn by the magnet, branch circuits from the battery through the motor and the magnet, each terminating in a brush near the vehicle axle and adapted to be closed alternately by the rotation of the axle.

6. In combination with a locomotive, a rotating brush on one of the axles of the tender, a battery constantly connected to said brush, two fixed brushes adapted to be alternately engaged by the rotating brush, branch circuits leading from the fixed brushes around to the battery, an electric motor in one branch, a controlling device for the motor in the other branch, and a record sheet feed roll adapted to be moved by the motor.

7. In combination with a locomotive, a record sheet feed roll, an electric motor for driving said roll, energizing and controlling circuits for said motor, a housing about one of the wheel axles, a battery connected to a rotating brush on the axle within the housing, and stationary brushes within the housing connected to the respective circuits and adapted to be alternately engaged by the rotating brush.

8. In combination with a wheeled vehicle, an electric motor, a record sheet feed roll adapted to be driven thereby, a circuit for the motor, a stop for the motor, and two switches in the motor circuit, one of them being actuated directly by the rotation of the vehicle wheel and the other being actuated in conjunction with the said stop by the movement of the motor itself.

9. In combination with a wheeled vehicle, a record sheet feed roll, a motor to drive said roll, an electro-magnet, a stop for the motor controlled by the electro-magnet, means depending on the rotation of the vehicle wheel to close the magnet circuit, the magnet being adapted when energized to remove the said stop and to close the motor circuit and the motor being adapted after it has gone a predetermined distance to again restore the said stop and break the circuit.

10. In a recording device, an electric motor and a wheel adapted to be rotated thereby, an electro-magnet, a pawl pivoted upon said wheel, a fixed ratchet adapted to be engaged by said pawl, an arm adapted to be swung by energization of the magnet, and a stud on said arm adapted to withdraw the pawl from the ratchet and thus release the wheel so that it may be rotated by the motor.

11. In a recording device, an electric motor, a wheel adapted to be rotated thereby, a pawl pivoted on said wheel and adapted to engage a fixed ratchet, an arm mounted on the same axis as the wheel, a series of buttons arranged near the periphery of the wheel, each button being adapted when contracted by the arm to close the motor circuit and the arm being adapted by its movement to withdraw the pawl from the ratchet.

12. In a recording device, a supply roll, a driving roll, a motor to drive the driving roll, a winding roll, a strip of paper extending from the supply roll around the driving roll to the winding roll, a winding gear, a spring connecting said gear to the winding roll, and connections between said motor and said gear, said connections comprising a part upon which said strip of paper bears and being rendered inactive by the pressure of said strip of paper when taut.

13. In a recording device, a supply roll, a driving roll, a motor to drive the driving roll, a winding roll, a strip of paper extending from the supply roll around the driving roll to the winding roll, a winding gear, a spring connecting said gear to the winding roll, and a train of gearing between said motor and winding gear, one member of said train being mounted in a movable bearing, said movable bearing comprising a part upon which said strip of paper bears.

14. In a recording device, a supply roll, a driving roll, a motor to drive the driving roll, a winding roll, a strip of paper extending from the supply roll around the driving roll to the winding roll, a winding gear, a spring connecting said gear to the winding roll, a train of gearing between said motor and winding gear, one member of said train being mounted in a movable bearing, said movable bearing comprising a part upon which said strip of paper bears, and a spring connected to said movable bearing and tending to hold said bearing in such position that the gear mounted therein will mesh with the other members of the train, the tension of said spring being such that the pressure of said strip of paper when taut will move said bearing against the tension of said spring.

15. In a device of the class described, a series of fluid pressure cylinders and plungers, a series of arms operatively connected to said cylinders and plungers, markers on said arms, connections between said cylinders and the sources of pressure to be recorded, the paths of movement of said markers being adjacent to each other and parallel, and a record sheet bearing guide lines parallel to the paths of movement of said markers.

16. In a railway train recorder, a paper supply roll, a receiving roll, a spring gear, a spring secured at one end to said gear and at the opposite end to said roll, a driving gear, an arm pivoted concentrically with said driving gear, an intermediate gear mounted in said arm and in mesh with said driving gear, and means dependent on the tension of the paper for moving said arm to carry said intermediate gear into and out of mesh with said spring gear.

17. In a device of the character described, a record sheet, a motor to drive the sheet, controlling means for the motor actuated by the movement of the vehicle, means for winding the record sheet faster than it is driven by the motor, and means actuated by said sheet for controlling said winding means.

In testimony whereof, we have subscribed our names.

SAMUEL THOMAS PARK.
JOHN EMMITT PHILLIPS.

Witnesses:
RICHARD F. LLOYD,
JOHN H. BEGGS.

---

Correction in Letters Patent No. 1,054,601.

It is hereby certified that in Letters Patent No. 1,054,601, granted February 25, 1913, upon the application of Samuel Thomas Park and John Emmitt Phillips, of Danville, Illinois, for an improvement in "Recording Devices for Vehicles," an error appears in the printed specification requiring correction as follows: Page 5, lines 91–92, for the word "contracted" read *contacted;* and that the said Letters Patent should be read with this correction therein, that the same may conform to the record of the case in the Patent Office.

Signed and sealed this 15th day of April, A. D., 1913.

[SEAL.]

C. C. BILLINGS,
*Acting Commissioner of Patents*